(12) United States Patent
Tipping

(10) Patent No.: US 6,633,857 B1
(45) Date of Patent: Oct. 14, 2003

(54) RELEVANCE VECTOR MACHINE

(75) Inventor: Michael Tipping, Girton (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/391,093

(22) Filed: Sep. 4, 1999

(51) Int. Cl.$^7$ .............................................. G06F 15/18
(52) U.S. Cl. .............................. 706/16; 706/20; 706/25
(58) Field of Search .................................... 706/15–44

(56) References Cited

U.S. PATENT DOCUMENTS

| | | | | | |
|---|---|---|---|---|---|
| 5,855,011 | A | * | 12/1998 | Tatsuoka | 706/45 |
| 6,301,571 | B1 | * | 10/2001 | Tatsuoka | 706/45 |

OTHER PUBLICATIONS

Mixtures of Principal Component Analyzers, Michael E. Tipping; Christopher M. Bishop; Artificial Neural Networks, Jul. 7–9, 1997, IEEE, Conference Publication No. 440, IEEE, pps. 13–18.*

Hierarchical Models for Data Visualization, Michael E. Tipping; Christopher M. Bishop; Artificial Neural Networks, Jul. 7–9, 1997, IEEE, Conference Publication. No. 440, pps. 70–75.*

The relevance vector machine technique for channel equalization application, Chen, S.; Gunn, S.R.; Harris, C.J. Neural Networks, IEEE Transactions on , vol.: 12 Issue: 6, Nov. 2001, Page(s): 1529–1532.*

Errata to "The relevance vector machine technique for channel equalization application" Chen, S.; Gunn, S.R.; Harris, C.J. Neural Networks, IEEE Transactions on , vol.: 13 Issue: 4 , Jul. 2002 Page(s): 1024–1024.*

Time series prediction based on the relevance vector machine with adaptive kernels Quinonero–Candela, J.; Hansen, L.K. Acoustics, Speech, and Signal Processing, 2002 IEEE International Conference on, vol.: 1, 2002, Page(s): 985–988.*

Block–adaptive kernel–based CDMA multiuser detection Chen, S.; Hanzo, L. Communications, 2002. ICC 2002. IEEE International Conference on , vol.: 2 , 2002 Page(s): 682–686 vol. 2.*

Michael E. Tipping, Sparse Bayesian Learning and the Relevance Vector Machine, Journal of Machine learning Research 1 (2001) pps. 211–244.*

MacKay, Bayesian non–linear modelling for the prediction competitions, in ASHRAE Transactions, vol. 100, pp. 1053–1062, ASHRAE, Atlanta, Georgia, 1994.

MacKay, Bayesian Interpolation, Neural Computation, 4(3): 415–447, 1992.

MacKay, The evidence framework applied to classification networks, Neural Computation, 4(5):720–736, 1992.

Neal, Lecture Notes in Statistics 118, Bayesian Learning for Neural Networks, pp. 15–17, 100–102, 113–116, 147–150 (Springer, 1996).

Platt, Fast training of support vector machines using sequential minimal optimization, in Advances in Kernal Methods: Support Vector Learning, MIT Press, Cambridge, MA (1999).

Vladimir N. Vapnik, Statistical Learning Theory, Chapter 10: The Support Vector Method for Estimating Indicator Functions, 1998, John Wiley & Sons, Inc., ISBN 0–471–03003–1.

* cited by examiner

*Primary Examiner*—Ramesh Patel
*Assistant Examiner*—Michael B. Holmes
(74) *Attorney, Agent, or Firm*—Amin & Turocy, LLP

(57) ABSTRACT

A relevance vector machine (RVM) for data modeling is disclosed. The RVM is a probabilistic basis model. Sparsity is achieved through a Bayesian treatment, where a prior is introduced over the weights governed by a set of hyperparameters. As compared to a Support Vector Machine (SVM), the non-zero weights in the RVM represent more prototypical examples of classes, which are termed relevance vectors. The trained RVM utilizes many fewer basis functions than the corresponding SVM, and typically superior test performance. No additional validation of parameters (such as C) is necessary to specify the model, except those associated with the basis.

23 Claims, 3 Drawing Sheets

RELEVANCE VECTOR MACHINE

FIELD OF THE INVENTION

This invention relates generally to data modeling and analysis, and more particularly to a relevance vector machine for such data modeling and analysis.

BACKGROUND OF THE INVENTION

Data modeling has become an important tool in solving complex and large real world computerizable problems. Applications of data modeling include data compression, density estimation and data visualization. A data modeling technique used for these and other applications is probabilistic modeling. It has proven to be a popular technique for data modeling applications such as speech recognition, vision, handwriting recognition, information retrieval and intelligent interfaces. One framework for developing such applications involves the representation of probability distributions as directed acyclic graphs, which are also known as Bayesian networks, belief networks, and probabilistic independence networks, among other terms.

In modeling such as probabilistic, usually a training data set is given that includes input vectors $$\{x_n\}_{n=1}^N$$

along with a set of corresponding targets $$\{t_n\}_{n=1}^N,$$

the latter of which can be real values, in the case of regression analysis, or class labels, in the case of classification analysis. From this training set, a model of p(t|x) is attempted to be inferred, with the object of making accurate predictions of t for new, unlabelled, examples of x. Generally, the principal challenge is to find the appropriate complexity of this model. Scoring alternative models by training set accuracy alone is usually undesirable, since increasing the model complexity, while reducing the training set error, can easily lead to over-fitting and poor generalization. A more robust approach is to introduce a prior distribution over models, which is used in conjunction with the information supplied by the training data to infer the prediction model. This prior distribution, also referred to as a prior, can be explicit, such as in a Bayesian framework, or can be implicit in other approaches.

One method for classification, that has also been extended to regression, is known as the support vector machine (SVM). Although it does not estimate p(t|x), it makes predictions based on a discriminant function of the form $$y(x) = \sum_{n=1}^N w_n K(x, x_n) + w_0,$$

where $\{w_n\}$ are the model weights and $K(\cdot,\cdot)$ is a kernel function. A feature of the SVM is that its cost function attempts to minimize the number of errors made on the training set while simultaneously maximizing the margin between the two classes, in the feature space implicitly defined by the kernel. This maximum-margin principle is an appealing prior for classification, and ultimately drives many of the weights to zero, resulting in a sparse kernel classifier where the non-zero weights are associated with $x_n$ that are either on the margin or lie on the wrong side of it. Model complexity is thus constrained such that only these support vectors determine the decision function. In practice, in addition to fitting the model to the training data, it is also necessary to estimate the parameters (usually, denoted C) which regulate the trade-off between the training errors and size of margin, which may entail additional cross-validation.

A disadvantage with the SVM as a general matter is that it utilizes many kernel functions, and may not yield as optimal test performance as may be desired. Furthermore, the SVM utilizes parameters (i.e., those denoted C), which add unwanted complexity to the model. For these and other reasons, there is a need for the present invention.

SUMMARY OF THE INVENTION

The invention relates to a relevance vector machine (RVM). The RVM is a probabilistic basis model of the same functional form of the SVM. Sparsity is achieved through a Bayesian treatment, where a prior is introduced over the weights governed by a set of what are referred to as hyperparameters—one such hyperparameter associated with each weight, whose most probable values are iteratively estimated from the data. The posterior distribution of many of the weights is sharply peaked around zero, in practice.

In one embodiment, a computer-implemented method includes inputting a data set to be modeled, and determining a relevance vector learning machine to obtain a posterior distribution over the learning machine parameters given the data set (also referred to as "the posterior"). This includes determining a marginal likelihood for the hyperparameters, and iteratively re-estimating the hyperparameters to optimize the marginal likelihood. For the case of regression analysis, the marginal likelihood is determined directly. For the case of classification analysis, the marginal likelihood is approximated through the additional determination of the most probable weights for the given hyperparameters, and the Hessian at that most probable weight value. This approximation is also iteratively redetermined as the hyperparameters are updated. At least the posterior distribution for the weights given the data set is then output by the method.

RVM has advantages not found in prior art approaches such as SVM. As compared to SVM, for example, the non-zero weights in the RVM have been seen to not be associated with examples close to the decision boundary, but rather appear to represent more prototypical examples of classes. These examples are termed relevance vectors. Generally, the trained RVM utilizes many fewer basis functions than the corresponding SVM, and typically superior test performance. Furthermore, no additional validation of parameters (such as C) is necessary to specify the model, save those associated with the basis.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
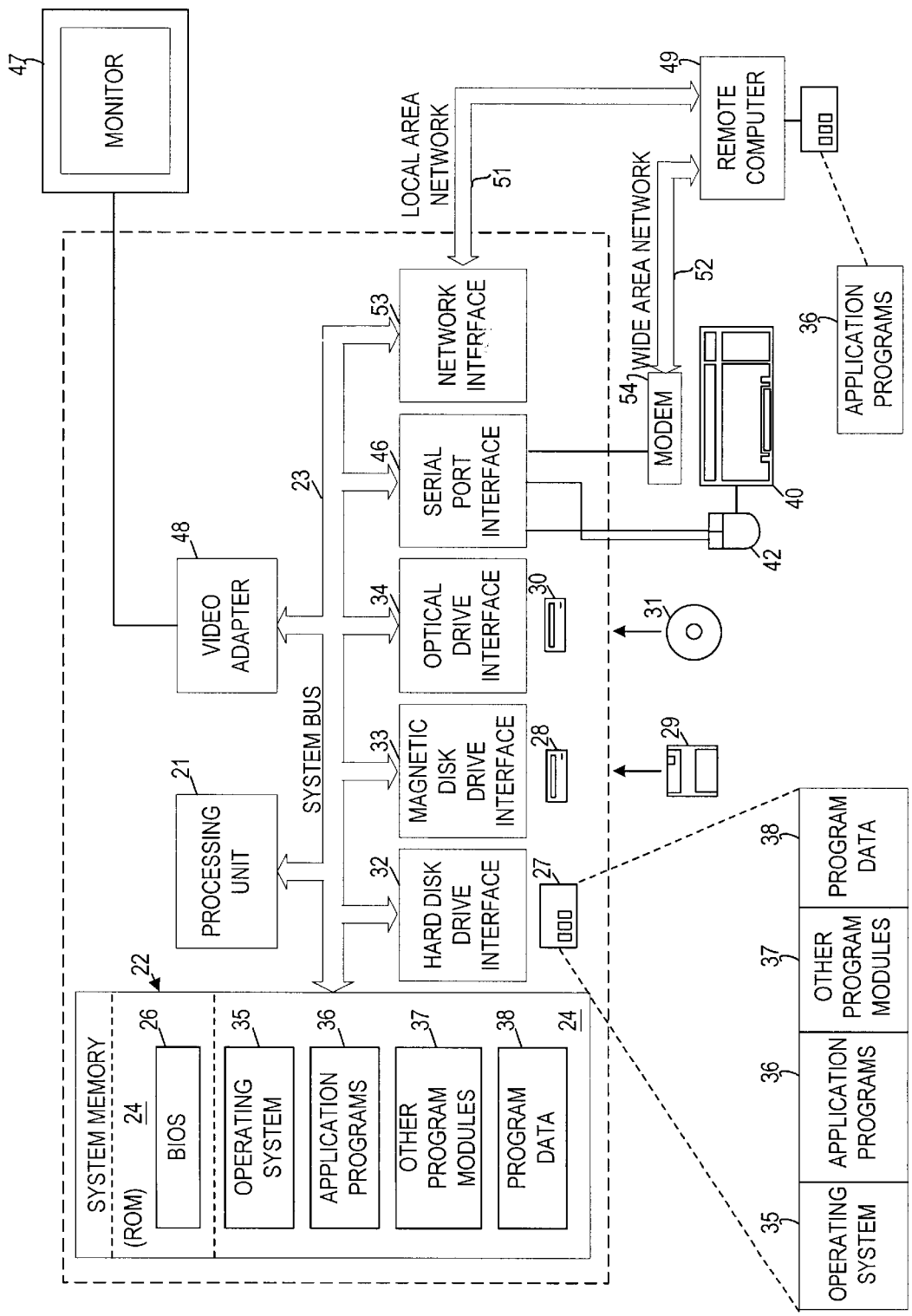
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Generalized Linear Prediction Models

Figure 2:
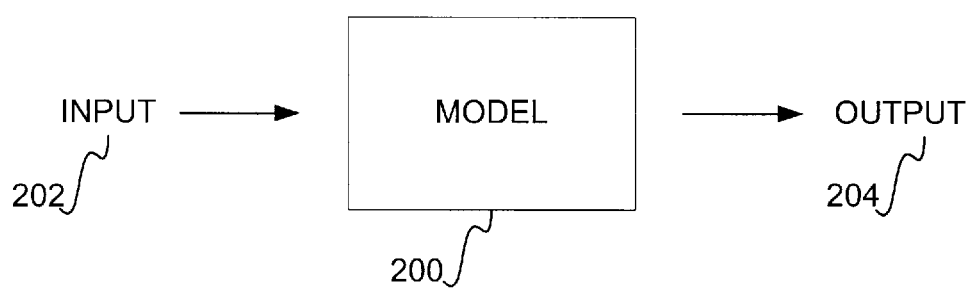
FIG. 2 is a diagram of a predictional model.

In this section of the detailed description, generalized linear prediction models are overviewed, as an introduction to the relevance vector machines described in the succeeding sections of the detailed description. Referring first to FIG. 2, a diagram of a prediction model is shown. The model 200 can be a linear prediction model, which accepts an input 202 and provides an output 204 based on the input 202. Thus, the model 200 must be constructed, which in one embodiment entails generating a prior distribution for the model based on a training set of input and output data input into a learning machine, such as a relevance vector machine (RVM) according to embodiments of the invention as described in succeeding sections of the detailed description.

Figure 3:
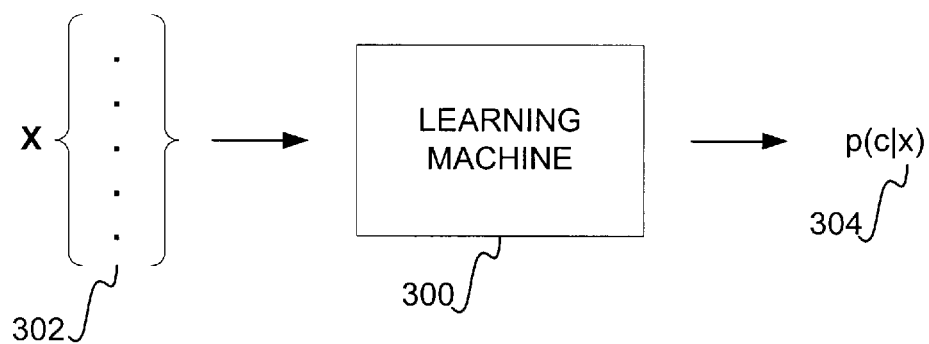
FIG. 3 is a diagram of a learning machine.

Referring next to FIG. 3, a diagram for a learning machine is shown. The learning machine 300 accepts a training set of data x 302, and ultimately outputs a posterior distribution p(c|x) 304, as has been described in the background section. The posterior distribution 304 is determined more specifically based on an output y(x) of the learning machine 300. In a generalized linear prediction model, the output y(x) of a learning machine (i.e., the machine used to obtain a model that can be utilized for predictional purposes) can be written as a link function g{·} applied to a linearly weighted sum, which can be denoted as s(x), of some, usually fixed, basis functions φ(x), where x is the vector of input variables to the machine. In other words, $$y(x)=g\{s(x)\},$$

where the weighted sum is $$s(x) = \sum_{i=1}^{M} w_i \phi_i(x),$$

and $w_i$ are the weights associated with the M basis functions.

Relevance Vector Regression

In this section of the detailed description, an embodiment of the invention relating to a relevance vector machine for regression analysis is described. Given a data set of input-target pairs $$\{x_n, t_n\}_{n=1}^{N},$$

it is assumed that the conditional distribution p(t|x) is of a Gaussian, or normal, form N(t|y(x), σ²). The mean of this distribution for a given x is modelled as a linear combination of N fixed basis, or kernel, functions, one located at each data point:

$$y(x) = \sum_{n=1}^{N} w_n \theta(x, x_n) + w_0,$$

where $w_0$ is a bias term. As used herein, the term basis function is a generalized term encompassing such specific basis functions as kernel functions, as can be appreciated by those of ordinary skill within the art. The likelihood of the data set is then $$p(t|x, w, \sigma^2) = (2\pi\sigma^2)^{-N/2} \exp\left\{-\frac{1}{2}(t - \Phi w)^T(\sigma^{-2}I)(t - \Phi w)\right\},$$

where t=(t₁ ... t_N), W=(w₀ ... w_N), and Φ is the N×(N+1) design matrix with $\Phi_{nm}=\phi(X_n, X_{m-1})$ and $\Phi_{n1}=1$. The negative logarithm of this likelihood can be viewed as an error function. Maximum-likelihood estimation of w and σ² generally leads to severe overfitting, so a preference for smoother functions is encoded by defining what is known as an ARD Gaussian prior within the art over the weights, $$p(w|\alpha) = \prod_{i=0}^{N} N(w_i|0, \alpha_i^{-1}),$$

with α being a vector of N+1 hyperparameters. The posterior over the weights is then obtained from Bayes' rule, $$p(w|t, \alpha, \sigma^2) = (2\pi)^{-(N+1)/2}|\Sigma|^{-1/2}\exp\left\{-\frac{1}{2}(w-\mu)^T\Sigma^{-1}(w-\mu)\right\},$$

with $$\Sigma=(\Phi^T B\Phi+A)^{-1},$$

$$\mu=\Sigma\Phi^T Bt,$$

where A has been defined as diag($\alpha_0, \alpha_1, \ldots, \alpha_n$), and B has been defined as $\sigma^{-2}I_N$, with $I_N$ the N×N identity matrix. Note that σ² is also a hyperparameter, which may be estimated from the data.

By integrating out the weights, the marginal likelihood, or evidence, for the hyperparameters is obtained:

$$p(t\mid\alpha,\sigma^2) = (2\pi)^{-N/2}|B^{-1} + \Phi A^{-1}\Phi^T|^{-1/2}\exp\left\{-\frac{1}{2}(t^T(B^{-1} + \Phi A^{-1}\Phi^T))^{-1}t\right\}.$$

Ideally, for Bayesian inference, the hyperpriors should be defined over $\alpha$ and $\sigma^2$, and the hyperparameters should be integrated out as well. However, such marginalization cannot be performed in closed-form here, so instead a pragmatic procedure is adopted, and the marginal likelihood is optimized with respect to $\alpha$ and $\sigma^2$, which is essentially what is known in the art as the type II maximum likelihood method. This is equivalent to finding the maximum of $p(\alpha,\sigma^2|t)$, assuming a uniform—and thus improper—hyperprior. Predictions are then made using these maximizing values.

Next, optimizing of the hyperparameters is described. Values of $\alpha$ and $\sigma^2$, which maximize, cannot be obtained in closed form, so two alternative methods are described for iterative re-estimation of $\sigma$. First, by considering the weights as hidden variables, an EM (Expectation Maximization) approach (which is an algorithm that is an iterative process for likelihood maximization in the presence of hidden variables) can be used, $$\alpha_i^{new} = \frac{1}{\langle w_i^2\rangle_{p(w|t,\alpha,\sigma^2)}} = \frac{1}{\Sigma_{ii} + \mu_i^2}.$$

Second, direct differentiation can be used, resulting in one potential update rule:

$$\alpha_i^{new} = \frac{\gamma_i}{\mu_i^2},$$

where the quantities $\gamma_i$ have been defined as $1-\alpha_i\Sigma_{ii}$, which can be interpreted as a measure of how well-determined each parameter $w_i$ is by the data. Other standard nonlinear optimization techniques may also be used.

For the noise variance, both methods lead to the same re-estimate, $$(\sigma^2)^{new} = \|t - \Phi\mu\|^2 \Big/ \left(N - \sum_i \gamma_i\right).$$

These updates are applied, after which the variables $\Sigma$ and $\mu$ are updated to take account of the new hyperparameter values. This re-estimation procedure is repeated until some appropriate convergence criterion is satisfied (e.g. the increase in the (log) likelihood is less than some small value, perhaps $10^{-6}$, and/or the change in (log) $\alpha$ is less than some similarly small criterion). In practice, during re-estimation, many of the $\alpha_i$ approach infinity, and the posterior distribution of their associated weights becomes infinitely peaked around zero, implying that the corresponding basis functions can be pruned.

Relevance Vector Classification

In this section of the detailed description, an embodiment of the invention relating to a relevance vector machine for classification analysis is described. Classification analysis is where it is desired to predict the posterior probability of class membership given the input x. The linear model described in the previous section is generalized by applying the logistic sigmoid function to y(x) and writing the likelihood as $$p(t\mid x, w) = \prod_{n=1}^{N} \sigma\{y(x_n)\}^{t_n}[1 - \sigma\{y(x_n)\}]^{1-t_n},$$

with $\sigma(y) = 1/(1+e^{-y})$.

However, the weights cannot be integrated out to obtain the marginal likelihood analytically, so while the same update equations for the hyperparameters are used as in the regression case, an additional iterative procedure is required at each update step in order to approximate the marginal likelihood. First, for the current values of $\alpha$ the most probable weights $w_{mp}$ (the location of the posterior mode) are found. This is equivalent to a standard optimization of a regularized logistic model, and the efficient iteratively reweighted least-squares algorithm is used to find the maximum. Any other nonlinear optimization method could also be used. Next, the Hessian is found at $w_{mp}$, $$\nabla\nabla\log p(t|x, w)|_{w_{MP}} = -(\Phi^T B\Phi + A),$$

where $B_{nn} = \sigma\{y(x_n)\}[1-\sigma\{y(x_n)\}]$, and this is negated and inverted to give the covariance $\Sigma$ for a Gaussian approximation to the posterior over weights, and from that an approximation to the marginal likelihood. As in the regression case, the hyperparameters $\alpha$ are updated using $$\alpha_i^{new} = \frac{\gamma_i}{\mu_i^2}.$$

It is noted that there is no noise variance $\sigma^2$.

This estimation of the marginal likelihood, followed by hyperparameter updating, is repeated until some suitable convergence criteria are satisfied (such as was given for the regression case earlier).

Application to Other Types of Models

As described in the preceding sections of the detailed description, the special case has been considered where s(x) is a weighted sum of kernel functions, where one kernel function is associated with each example in the training set, $$s(x) = \sum_{i=1}^{N} w_i\phi_i(x; x_i) + w_0,$$

where $w_0$ is an extra bias weight, as known within the art. The kernels are N functions of the input x, where each one is parameterized by an example vector $x_i$ from the training set. This choice of model for s(x) was made for illustrative purposes only, however.

Thus, the techniques described above are equally applicable to any collection of basis functions, as can be appreciated by those of ordinary skill within the art, and need not be restricted to the case of a kernel machine as has been described. For example, it can be applied to the basis functions described in the reference David J. C. Mackay, Bayesian Interpolation, Neural Computation, 4(3):415–417, 1992.

Additional Input Scale Parameters

Furthermore, an addition to the techniques described in the preceding section of the detailed description is the facility to determine additional input scale parameters associated with the basis/kernel functions. For example, a second-order polynomial basis function is considered, applied to d-dimensional input vectors, where $x=(x_1, x_2, \ldots, x_d)$ and likewise for z, $$\phi(x; z) = \left(\sum_{k=1}^{d} \eta_k x_k z_k + 1\right)^2.$$

The parameters $\eta_k$ control the scaling of each input variable k during computation of the basis functions, and are common across all basis functions.

Because $p(t|\alpha)$, as described in the preceding sections, is a function of the basis functions, it can also be optimized with respect to these input scale parameters $\eta=(\eta_1, \ldots, \eta_d)$, as well as the hyperparameters $\alpha$. This is achieved by determining the gradient of log $p(t|\alpha,\eta)$ with respect to both $\eta$ and $\alpha$, and utilizing a standard non-linear optimization routine to maximize $p(t|\alpha,\eta)$ with respect to both sets of parameters. This leads to even better complexity control and improved generalization.

Methods

In this section of the detailed description, methods for implementing a relevance vector machine, according to varying embodiments of the invention, are presented. The relevance vector machine allows a user to generate a simpler (less complex) model as compared to other techniques, such as a support vector machine. The computer-implemented methods are desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. It is noted that the description of the methods in this section implicitly rely on the description of the various relevance vector machine techniques as has been described in the preceding sections of the detailed description.

Figure 4:
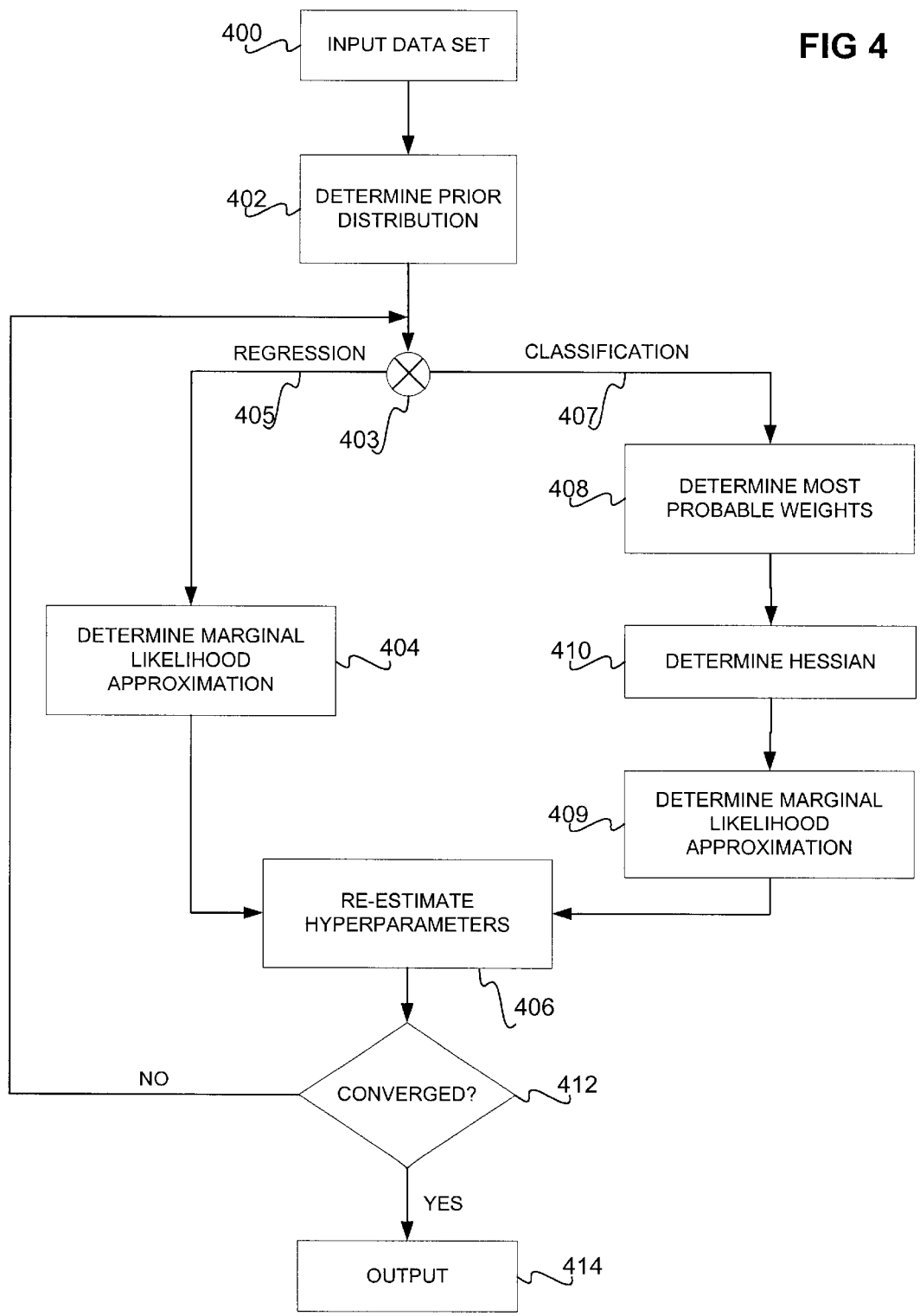
FIG. 4 is a flowchart of methods according to varying embodiments of the invention.

Referring to FIG. 4, in 400, a data set to be modeled is input. The data set desirably represents a real-world event or events—for example, the stories read by users of a web site, the television shows watched by viewers, etc. Inputting the data set in one embodiment also includes selecting a model for the data set, such as a generalized linear model as has been described—that is, a form for the ultimate model for the data set can be selected. The invention is not limited to the manner by which input is conducted in 400. For example, the data set may be input by being received from a communications device, from a storage device, etc.

In 402, a prior distribution (e.g., a Gaussian, or normal, distribution) is determined for the data set, so that a model can be constructed for predictional purposes for new data to be input into the model. The model, for example, can be a linear model. For further example, this involves determining a relevance vector learning machine that has a number of basis functions to obtain the posterior distribution for the data set. The prior distribution for the model has a number of weights, and is determined by utilizing a corresponding number of hyperparameters, as has been described, to simplify the model. Depending on whether regression analysis or classification analysis is desired, the method follows from the decision bubble 403 to the path of 404, 406 and 412 (as indicated by the line 405) or the path of 408, 410, 409, 406 and 412 (as indicated by the line 407), respectively.

For the regression case, in 404 a marginal likelihood for the hyperparameters is determined, and in 406 the hyperparameters are re-estimated to optimize them, as has been described. Block 406 can be performed, for example, by utilizing the EM approach, or the direct differentiation approach. In 412, it is determined whether a predetermined convergence criteria has been satisfied; if not, then the method repeats 404 and 406.

For the classification case, in 408, the most probable weights are determined for each hyperparameters, in 410 the Hessian is determined at the most probable weights, and in 409 a marginal likelihood approximation is determined, as have been described. In 406 the hyperparameters are re-estimated to optimize them, as has also been described. In 412 it is determined whether a predetermined convergence criteria has been satisfied; if not, then the method repeats 408, 410, 409 and 406.

Finally, in 414, at least the posterior distribution, as has been determined, is output. The complete model, including the distribution, may be output as well in one embodiment. The invention is not limited to the manner by which output is accomplished. For example, in one embodiment, output can be to a further analysis program or software component, that allows for analysis and conclusions to be drawn. As another example, output can be displayed on a displayed device, or printed to a printer, etc. As a third example, output can be stored on a storage device, for later further analysis program or software component.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A computer-implemented method operable on a data set to be modeled, comprising:
   determining a prior distribution for the data set for modeling thereof, the prior distribution having a plurality of weights and a corresponding plurality of hyperparameters;
   determining a relevance vector learning machine to obtain a posterior distribution; and
   outputting the posterior distribution for the data set.

2. The method of claim 1, wherein determining a prior distribution comprises:
   determining a marginal likelihood for the plurality of hyperparameters; and
   iteratively re-estimating the plurality of hyperparameters to optimize the plurality of hyperparameters.

3. The method of claim 2, wherein optimizing a marginal likelihood comprises utilizing an EM approach.

4. The method of claim 2, wherein optimizing a marginal likelihood comprises utilizing a direct differentiation approach.

5. The method of claim 1, wherein determining a prior distribution comprises:
   for each hyperparameter, determining most probable weights;
   determining a Hessian at the most probable weights; and,
   repeating until a predetermined convergence criteria has been satisfied.

6. The method of claim 1, wherein determining a prior distribution for the data set for modeling thereof comprises determining the prior distribution for the data set for linear modeling thereof.

7. The method of claim 1, wherein determining a prior distribution for the data set for modeling thereof comprises determining the prior distribution for the data set for classification modeling thereof.

8. The method of claim 1, wherein the prior distribution comprises a Gaussian prior distribution.

9. A computer-implemented method comprising;
   determining a relevance vector learning machine to obtain a posterior distribution of a data set to be modeled; and,
   outputting at least the posterior distribution for the data set.

10. The method of claim 9, wherein determining a relevance vector learning machine comprises determining a plurality of weights for the posterior distribution based on a plurality of basis functions by utilizing a corresponding plurality of hyperparameters.

11. The method of claim 10, wherein the plurality of basis functions comprises a plurality of kernel functions.

12. A computer-implemented method comprising;
   selecting a model for a data set to be modeled;
   determining a prior distribution for the model having a plurality of weights by utilizing a corresponding plurality of hyperparameters to simplify the model;
   determining a relevance vector learning machine to obtain a posterior distribution; and
   outputting at least the posterior distribution for the model.

13. A machine-readable medium having instructions stored thereon for execution by a processor to perform a method comprising:
   inputting a data set to be modeled;
   determining a prior distribution for the data set for modeling thereof, the prior distribution having a plurality of weights and a corresponding plurality of hyperparameters, comprising,
      determining a marginal likelihood for the plurality of hyperparameters;
      iteratively re-estimating the plurality of hyperparameters to optimize the plurality of hyperparameters;
   determining a relevance vector learning machine to obtain a posterior distribution; and
   outputting the posterior distribution for the data set.

14. The medium of claim 13, wherein optimizing a marginal likelihood comprises utilizing an EM approach.

15. The medium of claim 13, wherein optimizing a marginal likelihood comprises utilizing a direct differentiation approach.

16. The medium of claim 13, wherein the prior distribution comprises a normal distribution.

17. A machine-readable medium having instructions stored thereon for execution by a processor to perform a method operable on a data set to be modeled comprising:
   determining a prior distribution for the data set for modeling thereof, the prior distribution having a plurality of weights and a corresponding plurality of hyperparameters, comprising:
      for each hyperparameter, determining most probable weights;
      determining a Hessian at the most probable weights;
      repeating until a predetermined convergence criteria has been satisfied; and,
   outputting a posterior distribution for the data set.

18. The medium of claim 17, wherein the prior distribution comprises a normal distribution.

19. A machine-readable medium having instructions stored thereon for execution by a process to perform a method operable on a data set to be modeled comprising:
   selecting a model for the data set;
   determining a prior distribution for the model having a plurality of weights by utilizing a corresponding plurality of hyperparameters to simplify the model;
   determining a relevance vector learning machine to obtain a posterior distribution; and
   outputting at least the posterior distribution for the model.

20. The medium of claim 19, wherein the model comprises one of: a linear model, and a classification model.

21. A machine-readable medium having instructions stored thereon for execution by a process to perform a method comprising:
   determining a relevance vector learning machine having a plurality of basis functions to obtain a posterior distribution for a data set to be modeled; and,
   outputting at least the posterior distribution for the data set.

22. The medium of claim 21, wherein determining a relevance vector learning machine comprises determining a plurality of weights for the posterior distribution based on a plurality of basis functions by utilizing a corresponding plurality of hyperparameters.

23. The medium of claim 21, wherein the model comprises one of: a linear model, and a classification model.

* * * * *